United States Patent [19]

Kobayasi

[11] 4,172,517

[45] Oct. 30, 1979

[54] APPARATUS FOR FEEDING WORKPIECES INTERMITTENTLY

[75] Inventor: Susumu Kobayasi, Uozu, Japan

[73] Assignee: Yoshida Kogyo K.K., Tokyo, Japan

[21] Appl. No.: 847,602

[22] Filed: Nov. 1, 1977

[30] Foreign Application Priority Data

Nov. 2, 1976 [JP]  Japan ............................... 51/132183

[51] Int. Cl.$^2$ ............................................. B65G 25/00
[52] U.S. Cl. .................................... 198/621; 198/742;
198/774
[58] Field of Search ............... 198/485, 487, 459, 621,
198/653, 740–742, 736, 738, 774, 737; 214/1
BB, 1 F, 1 P

[56] References Cited

U.S. PATENT DOCUMENTS 3,301,374  1/1967  Proctor ................................ 198/742

FOREIGN PATENT DOCUMENTS 2713303 10/1977 Fed. Rep. of Germany ........... 198/742
349920 12/1960 Switzerland .............................. 198/740

*Primary Examiner*—Joseph E. Valenza
*Attorney, Agent, or Firm*—Hill, Van Santen, Steadman, Chiara & Simpson

[57] ABSTRACT

An apparatus for feeding elongate workpieces intermittently sideways one by one to successively located machining and parts-assembling stations includes a pair of first parallel spaced feed rods supported on a transfer table and extending in a direction in which the workpieces are transferred. Each of the first feed rods has a plurality of workpiece-engaging projections spaced therealong at an interval that corresponds to a distance at which the processing stations are spaced. A second rod extends parallel to the first feed rods and has a plurality of second workpiece-engaging projections spaced therealong at the above-mentioned interval. The first and second rods are coupled together through a lost motion drive, and are axially movable between advanced and retracted positions. Upon engagement of the lost motion drive, the first and second projections jointly provide a plurality of workpiece holders while the first and second rods are being advanced. The first and second rods are rotatable about their axes between a first position in which the first and second projections can engage the workpieces and a second position in which the first and second projections can disengage the workpieces. A pair of support rails is disposed along the opposite sides of the table for slidably supporting the workpieces being fed by the workpiece holders.

7 Claims, 14 Drawing Figures

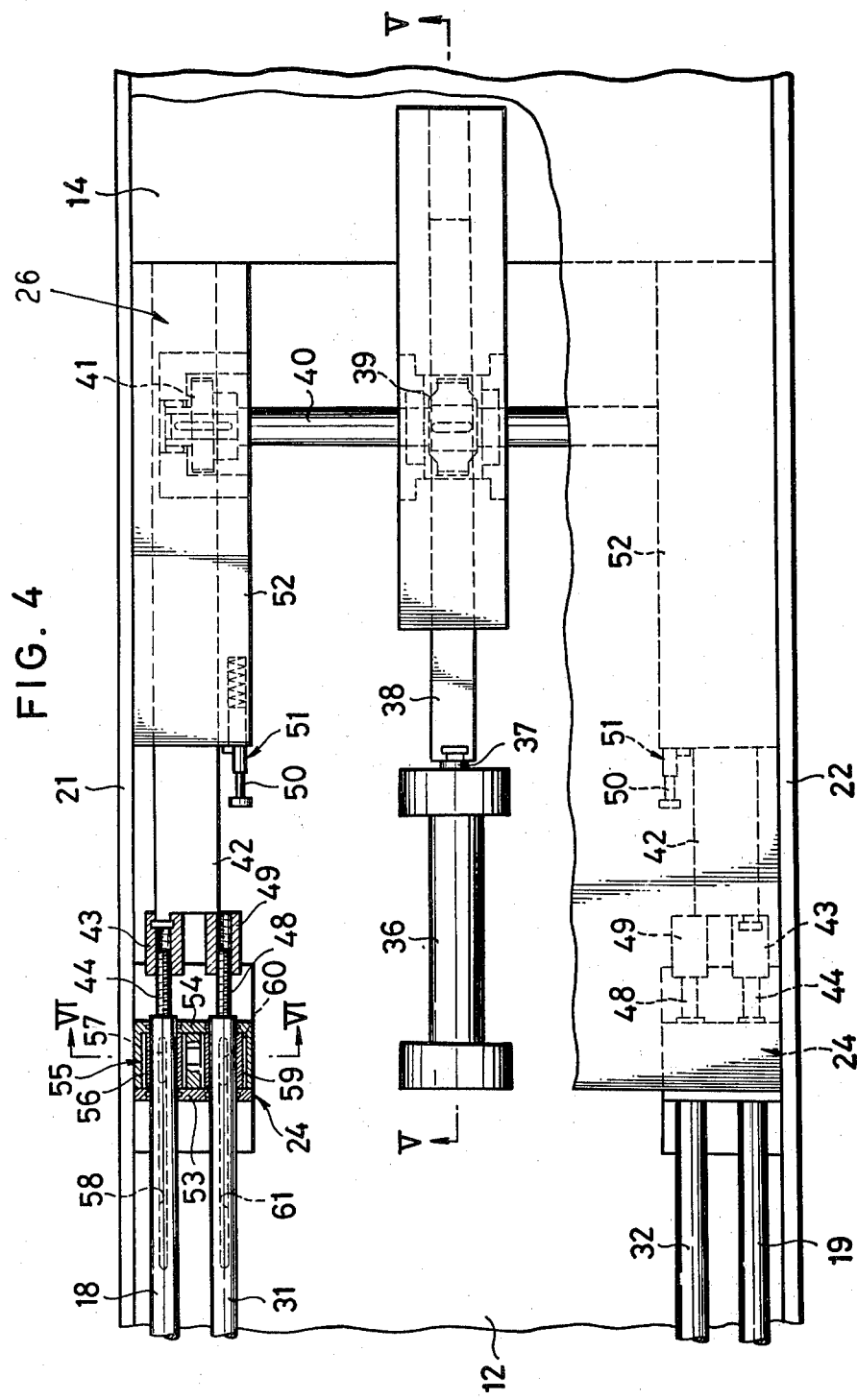

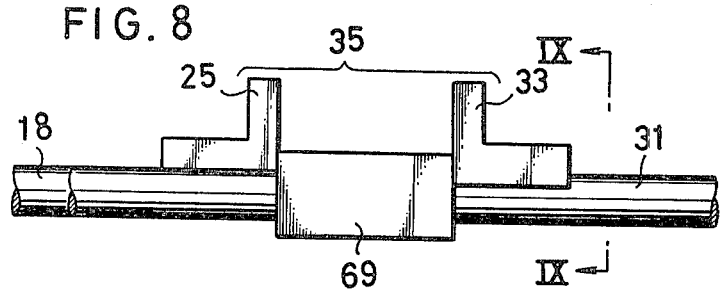
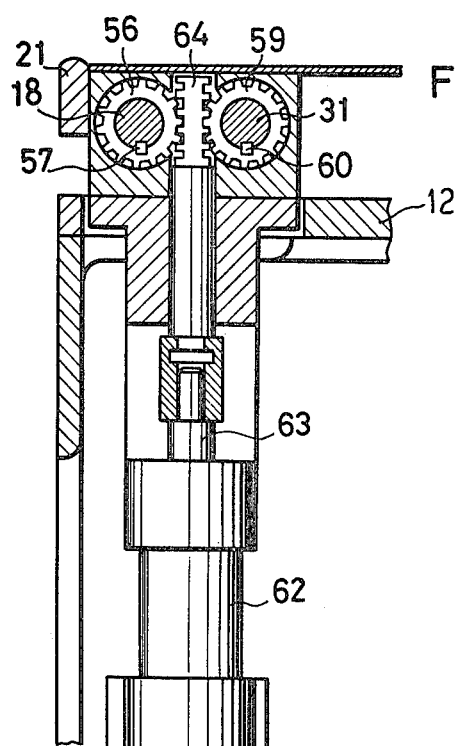
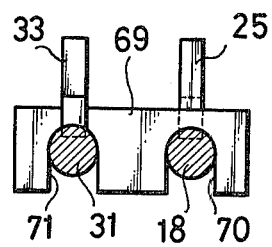
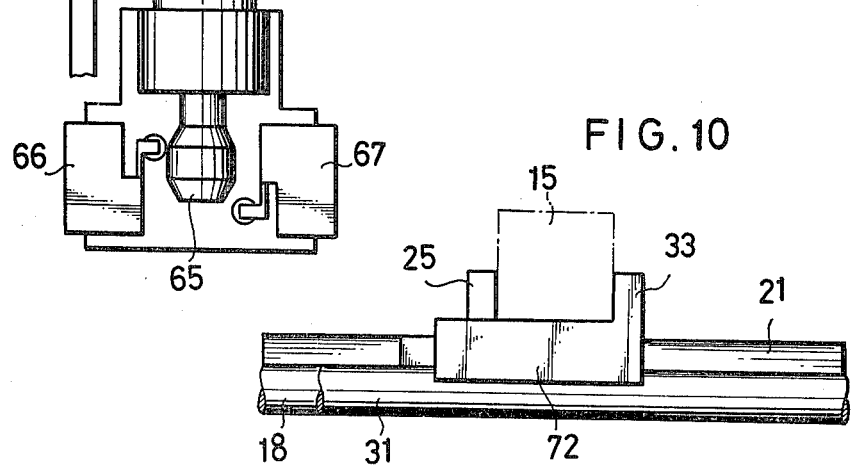

APPARATUS FOR FEEDING WORKPIECES INTERMITTENTLY

BACKGROUND OF THE INVENTION

Field of the Invention

The present invention relates to an apparatus for feeding workpieces intermittently.

SUMMARY OF THE INVENTION

According to this invention, an apparatus comprises a pair of parallel spaced first rods supported on a table, each first rod having a plurality of first projections spaced therealong one from another at an interval, and a second rod extending parallel to the first rods, the second rod having a plurality of second projections spaced therealong one from another at the interval. The first and second projections are located out of transverse alignment with one another. The first and second rods are axially movable by first means between advanced and retracted positions. The second rod has a lost motion drive with the first rods, and the first and second projections jointly providing a plurality of workpiece holders upon engagement of the lost motion drive while the first and second rods are moved from the retracted to the advanced position. Second means on the table can slidably support the workpieces being fed intermittently. The first and second rods are rotatable by third means about their axes between a first position in which the first and second projections are in the path of the workpieces and a second position in which the first and second projections retracted from such path.

An object of the present invention is to provide an apparatus for feeding workpieces such as sash bars intermittently sideways one by one to stations in which their ends can be machined for assembly.

Many other advantages, features and additional objects of the present invention will become manifest to those versed in the art upon making reference to the detailed description of the accompanying sheets of drawings in which preferred structural embodiments incorporating the principles of the present invention are shown by way of illustrative example.

BRIEF DESCRIPTION OF THE DRAWINGS

FIG. 4 is a top plan view, partly broken away and shown in cross section, of a drive mechanism employed in the apparatus of FIG. 1;

FIG. 6 is a cross-sectional view taken along line VI—VI of FIG. 4;

FIG. 8, appearing with FIG. 6, is a front elevational view of a workpiece holder of feed rods with a spacer therein;

FIG. 9, appearing with FIG. 6, is a cross-sectional view taken along line IX—IX of FIG. 8; and FIG. 10, appearing with FIG. 6, is a front elevational view of a modified base.

DESCRIPTION OF THE PREFERRED EMBODIMENTS

Figure 1:
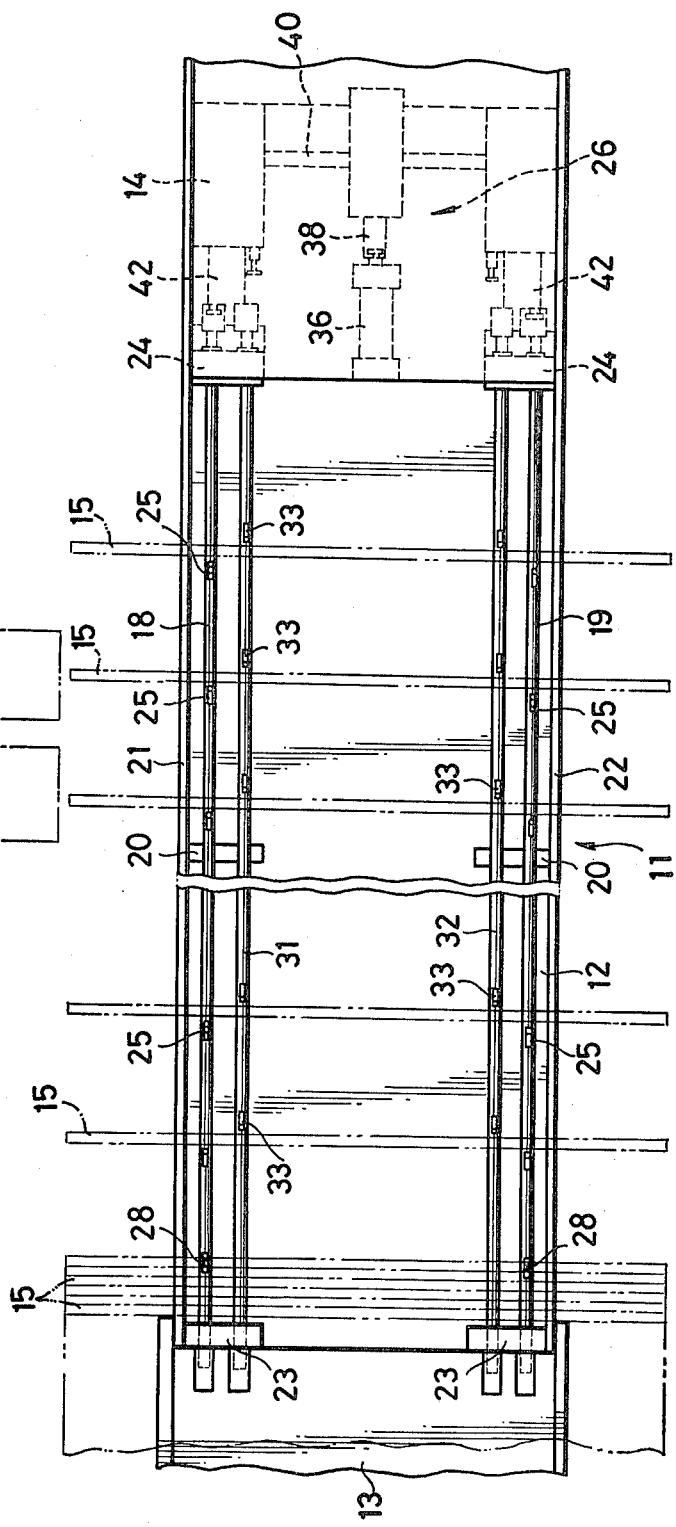
FIG. 1 is a top plan view of an apparatus constructed in accordance with the present invention.

The present invention is particularly useful when embodied in an apparatus such as shown in FIG. 1 generally indicated by the numeral 11. The apparatus 11 includes an elongated transfer table 12, a workpiece loading table 13 coupled to one end of the transfer table 12, and a workpiece unloading table 14 coupled to the other end of the transfer table 12. A plurality of elongate workpieces 15 such as sash bars are placed successively on the loading table 13 and fed intermittently sideways one by one over the transfer table 12 to a series of stations where various machine tools as indicated by the numerals 16,17 are provided alongside of the transfer table 12, the machine tools working on the workpieces 15 for cutting their ends, attaching necessary parts, or performing other machining operations thereon.

A pair of parallel first feed rods 18,19 extend in a direction in which the workpieces 15 are to be transferred, and are slidably supported on a number of supports 20 on the transfer table 12 and are spaced laterally a distance from each other, which distance is shorter than the length of the individual workpieces 15. The transfer table 12 has a pair of support rails 21,22 extending along the opposite sides of the table 12 and projecting upwardly beyond the feed rods 18,19, the support rails 21,22 being mounted on the supports 20. Each of the feed rods 18,19 has both ends supported respectively in bearing units 23,24 for axial movement and for rotation about its own axis.

Each feed rod has thereon a plurality of first workpiece-engaging projections 25 spaced therealong one from another at an interval which is equal to an interval at which the adjacent machine tools 16,17 are spaced apart from each other for acting on the workpieces. Under the workpiece unloading table 14, there is a drive mechanism 26 that enables the feed rods 18,19 to move in unison axially between advanced and retracted positions for a stroke which is greater than the interval at which the projections 25 are spaced one from another. The projections 25 on one of the feed rods 18 are held respectively in transverse alignment with the projections 25 on the other of the feed rods 19 at all times while the feed rods 18,19 reciprocate together.

Figure 2:
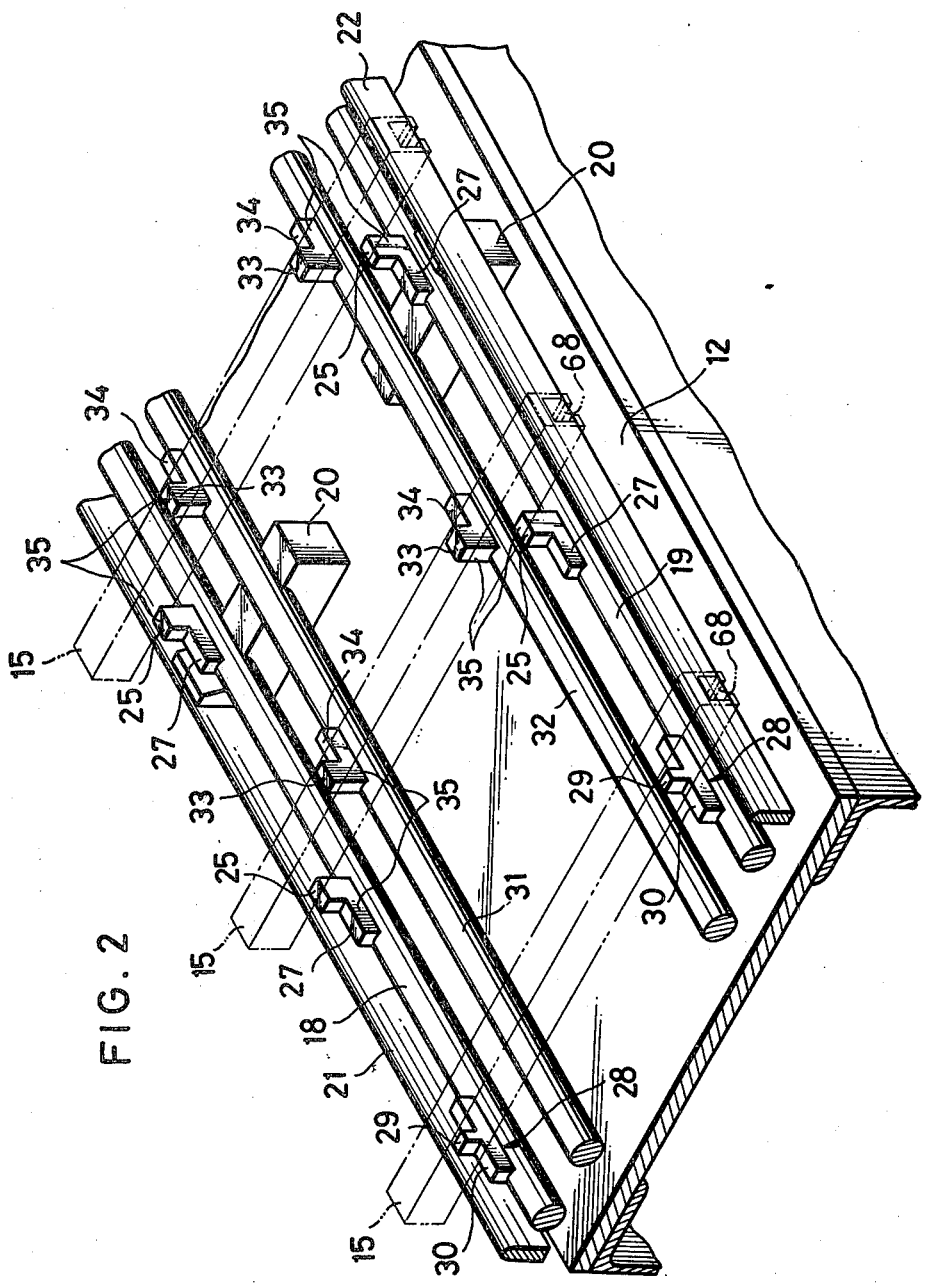
FIG. 2 is an enlarged fragmentary perspective view of a portion of the apparatus shown in FIG. 1.

As shown in FIG. 2, each projection 25 includes a base 27 fixed to the feed rod, the projections 25 being greater in height than the support rails 21,22. The bases 27 are directed toward the workpiece loading table 13. Each of the feed rods 18,19 has a workpiece catching member 28 at one end thereof near the bearing unit 23, the workpiece catching member 28 including a projection 29 extending from a base 30 secured to the feed rod 18,19. The projections 29 of the workpiece catching members 28 engage the workpieces 15 one at a time to pull the workpiece 15 over the transfer table 12.

As shown in FIGS. 1 and 2, at least one and preferably a pair of parallel second feed rods 31,32 extend in the workpiece transferring direction, and are supported on the supports 20 and spaced laterally apart from each other, the second feed rods 31,32 extending adjacent and parallel to the feed rods 18,19, respectively. Each of the second feed rods 31,32 has both ends supported respectively in the bearing units 23,24 for axial movement and for rotation about its own axis. Each second feed rod has thereon a plurality of second workpiece-engaging projections 33 spaced one from another at a spaced interval therealong which is equal to the interval at which the adjacent machine tools 16,17 are spaced apart from each other, for acting on the individual workpieces 15. The projections 33 on one of the second feed rods 31 are held respectively in transverse alignment with the projections 33 on the other of the second feed rods 32.

Each projection 33 on the second feed rods 31,32 includes a base 34 fixed to one of the second feed rods, and extends upwardly beyond the support rails 21,22. The bases 34 are directed toward the workpiece unloading table 14. The first projections 25 on the first feed rods 18,19 are located out of transverse alignment with the second projections 33 on the second feed rods 31,32. The projections 25 and 33 can jointly provide a plurality of workpiece holders 35 that are receptive of the workpieces 15 therein for advancing movement along the transfer table 12. The second projections 33 are positioned a distance ahead of the associated first projections 25 in the workpiece feeding direction, the distance being greater than the width of the workpieces 15.

Figure 5:
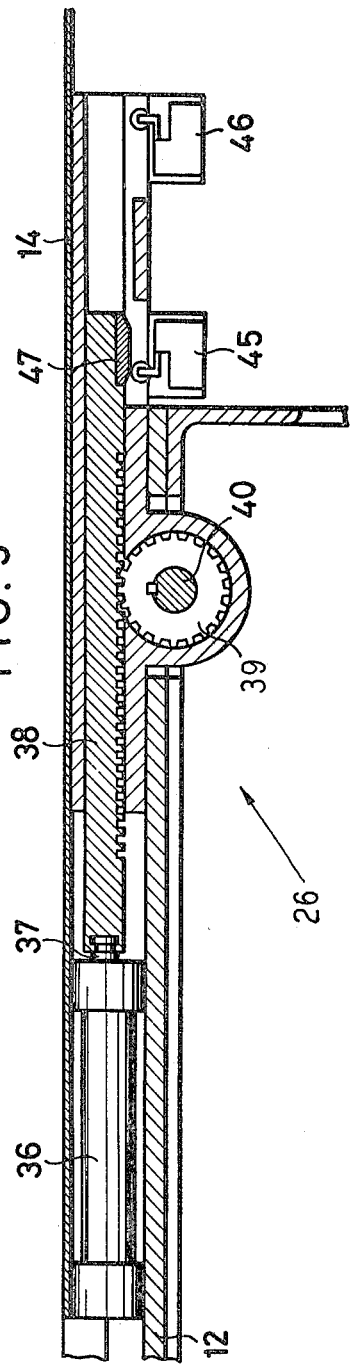
FIG. 5, appearing with FIG. 3, is a cross-sectional view taken along line V—V of FIG. 4.

FIGS. 4 and 5 illustrate the drive mechanism 26 including a central cylinder actuator 36 with a piston rod 37 connected at its one end to a central rack 38 which is in driving mesh with a pinion 39 rotatably mounted on the workpiece unloading table 14. Fixed to the pinion 39 is a shaft 40 having its ends connected to a pair of pinions 41 (only one shown in FIG. 4) which drivingly mesh with a pair of racks 42,42 to which ends of the first feed rods 18,19 that protect beyond the bearing units 24,24 are coupled via nuts 43,43 each having one end connected to and rotatable relatively to the rack 42. The other ends of the nuts 43,43 threadedly receive therein a pair of externally threaded spindles 44,44 fixed coaxially to the ends of the first feed rods 18,19, respectively. Fine adjustment of the position of the projections 25 on each of the first feed rods 18,19 can be made by turning the nut 43 relatively to the threaded spindle 44 so as to move the feed rod axially toward or away from the rack 42. The cylinder actuator 36 is actuatable by a control unit (not shown), energization of which is controlled by a pair of limit switches 45,46 (FIG. 5) that can be activated by engagement with a land 47 on the central rack 38. Thus, the central rack 38 is restricted in its movement between advanced and retracted positions.

When the cylinder actuator 36 is actuated to move the piston rod 37 from the position of FIG. 4, the central rack 38 is moved from the retracted to the advanced position, thereby enabling the racks 42,42 to pull the feed rods 18,19 from their retracted position shown in FIG. 1 to the advanced position, the distance between the retracted and advanced positions of the feed rods 18,19 being greater than the interval between adjacent machine tools such as 16,17, or between adjacent projections 25 on the feed rods 18,19.

Each of the second feed rods 31,32 has an end projecting beyond the bearing unit 24, the end having an externally threaded spindle 48 fixed coaxially thereto. The spindle 48 extends threadedly into a nut 49 at one end thereof with the other end of the nut 49 engageable with the rack 42 endwise. The nut 49 is also engageable with a spring-biased rod 50 of a cushioning device 51 mounted in a rack holder 52 fixed to the table 14.

The bearing units 24,24 shown in FIG. 4 are the mirror image of each other, and one of them which is shown in cross section includes a pair of spaced bearing walls 53,54 mounted on the table 12, through which extend the first feed rod 18 and the second feed rod 31 at their end portions, both rods being journaled for rotation about their axes. The bearing unit 24 contains a gearing 55 including a gear 56 disposed around the first feed rod 18, the gear 56 being fixed by means of a key 57 for corotation with the first feed rod 18. The feed rod 18 has an elongate keyway 58 which is greater in length than the transfer interval of the workpieces 15, the keyway 58 allowing the feed rod 18 to move axially with respect to the gear 56. Likewise, a gear 59 is disposed around the second feed rod 31, the gear 59 being fixed by means of a key 60 to the feed rod 31 for corotation therewith. The feed rod 31 has an elongate keyway 61 which is substantially equal in length to the transfer interval of the workpieces 15, the keyway 61 allowing the feed rod 31 to move axially with respect to the gear 59.

As shown in FIG. 6, a cylinder actuator 62 is mounted in the transfer table 12 and has a piston rod 63 to which is secured a rack 64 having a pair of toothed sides that mesh drivingly with the gears 56,59 respectively. One end of the piston rod 63 which is remote from the rack 64 extends downwardly beyond the cylinder and has a large-diameter portion 65 which is engageable with a pair of limit switches 66,67 for control of the cylinder actuator 62.

Figure 3:
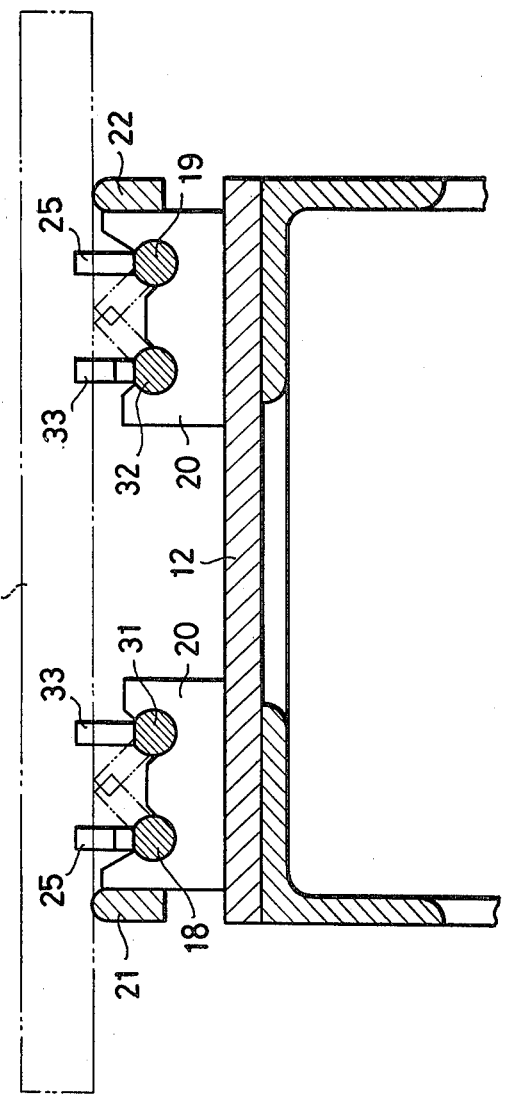
FIG. 3 is a cross-sectional view of the portion shown in FIG. 2.

When the cylinder actuator 62 is energized to move its piston rod 63 from the position of FIG. 6, the rack 64 is moved downwardly and causes the gear 56 on the feed rod 18 to rotate in one direction and the gear 59 on the feed rod 31 to rotate in the opposite direction simultaneously. Upon arrival of the rack 64 at its lower limit that is governed by the limit switch 67, each of the projections 25,33 on the feed rods is pivoted down to a position in which it releases the workpiece 15, as illustrated by broken lines in FIG. 3.

Figure 7A:
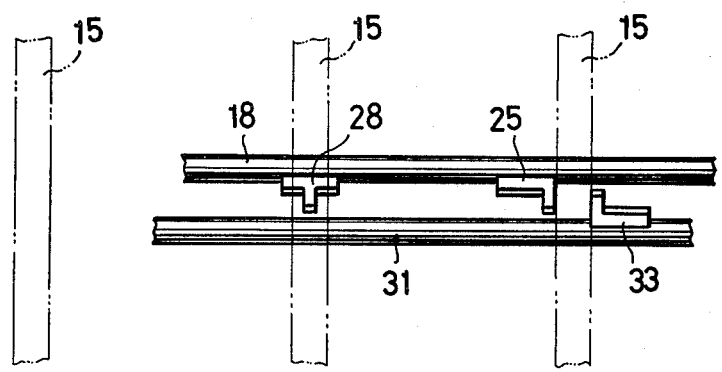
FIGS. 7A through 7E show sequential operation of feed and support rods in the apparatus.
Figure 7B:
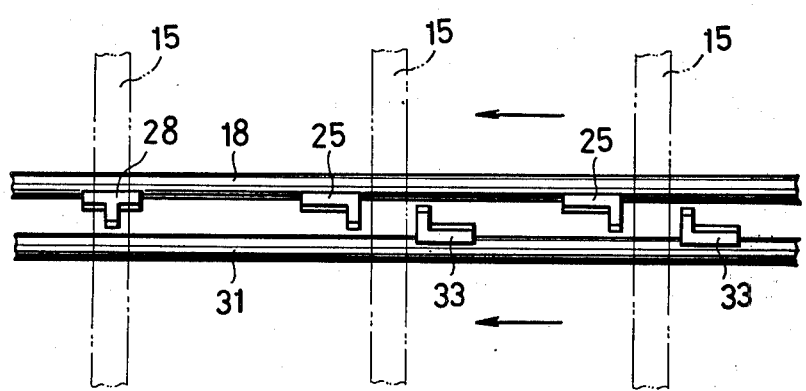
Figure 7C:
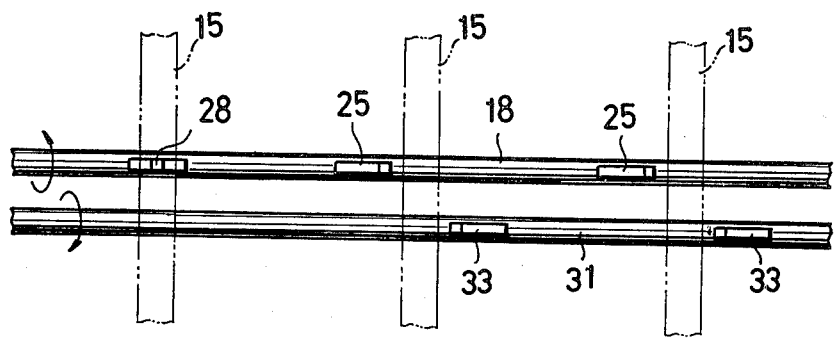

Operation of the apparatus is described with reference to FIGS. 7A through 7E in which only the first feed rod 18 and the second feed rod 31 are shown for clarity. The workpieces 15 placed successively on the workpiece loading table 13 are pushed sideways forwardly by means of a suitable intermittently feeding machine which operates in timed relation to the drive mechanism 26. With the central piston rod 37 extended, the cylinder 62 is actuated to rotate the first and second feed rod 18,31 about their axes, thereby causing the projections 25,33 and the workpiece catching member 28 to pivot down to a lowered position in which they release the workpieces 15 previously fed thereby (FIG. 7A). When movement of the rack 64 reaches its lower limit, the limit switch 67 is actuated to deenergize the cylinder 62 and energize the central cylinder 36 which then retracts its piston rod 37. The feed rod 18 with the projections 25 and the workpiece catching member 28 directed downwardly moves first from the advanced to the retracted position. Then, the feed rod 31 with the projections 33 directed downwardly is moved from the advanced to the retracted position by engagement of the nut 49 with the moving rack 42, whereupon the feed rods 18 and 31 are moved backward together with the projections 25 spaced from the associated projections 33 a distance greater than the width of the workpieces 15, as shown in FIG. 7B. The interval between the advanced and retracted positions of the feed rod 31 is smaller than the workpiece transfer interval. Upon arrival of the feed rods 18,31 at the retracted position, the central cylinder 36 is de-energized by the limit switch 45 and the workpiece catching member 28 is located in a position just under the next workpiece 15 to be fed from the loading table 13. When a timer switch (not shown) is turned off after completion of the operation of the machine tools that have acted on the workpieces 15 over the transfer table 13, the cylinder 62 is actuated to extend its piston rod, thereby rotating the feed rods 18,31 in the opposite directions to bring the projections 25,33 and the workpiece catching member 28 into a raised position in which the projections 25 and the associated projections 33 receive loosely therebetween workpieces 15 over the transfer table 12 and the workpiece catching member 28 catches the next workpiece 15 from the table 13; that is, the projection 29 on the workpiece catching member 28 enters a slot 68 (FIG. 2) in the workpiece 15 (FIG. 7C).

Figure 7D:
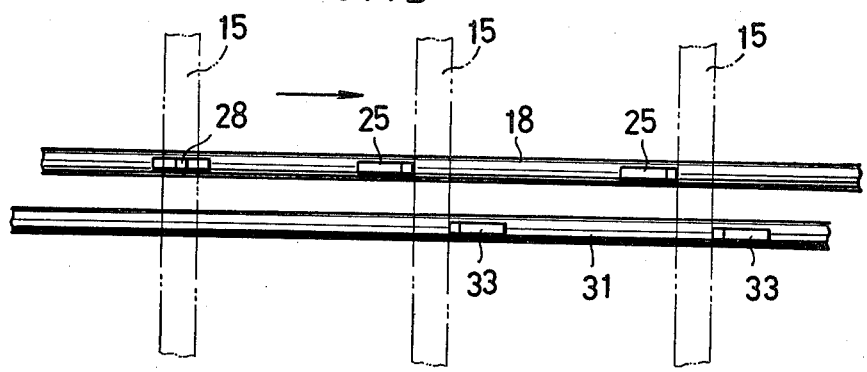
Figure 7E:
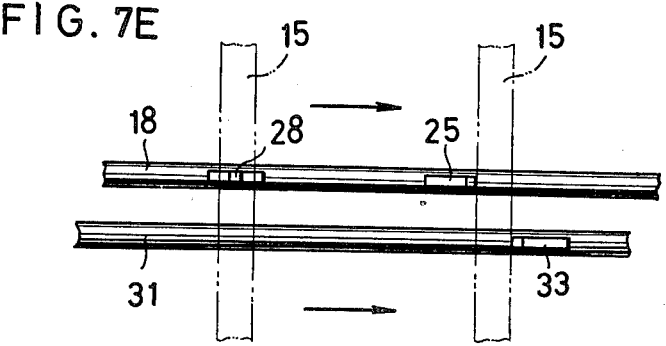

Upward movement of the piston rod 63 of the cylinder 62 causes the limit switch 66 to be actuated, whereupon the cylinder 62 is de-energized and the cylinder 36 is energized, whereupon its piston rod 37 starts to extend, thereby advancing the first feed rod 18 from the retracted position. The advancing first feed rod 18 then causes its projections 25 to engage and push the workpieces 15 forwardly which then engage and push the projections 33 on the second feed rod 31, whereby the feed rods 18,31 travel together toward their advanced position (FIG. 7D). During advancing movement of the feed rods 18,31, the projections 25,33 jointly provide the workpiece holders 35 that hold the workpieces 15, respectively, and feed them toward next processing stations along the transfer table 12 in which various machining and assembling operations are to be effected. Thus, with this arrangement, the first and second feed rods 18,31 are coupled with each other through a lost motion drive, which includes a workpiece or a substitute spacer described below. When the feed rods 18,31 reach their advanced position (FIG. 7E), the limit switch 46 is actuated to de-energize the central cylinder 36 thereby bringing the movement of the feed rods 18,31 to a stop. Excessive advancing movement of the feed rod 31 due to inertia is prevented by engagement of the nut 49 with the spring-biased rod 50 of the cushioning device 51.

The above cycle of operation is repeated to feed the workpieces 15 intermittently in sequence toward the successively located processing stations for automatic finishing of the workpieces 15.

As shown in FIGS. 8 and 9, (sheet 5) a spacer 69 extends across two adjacent feed rods 18,31 and is disposed between the projections 25,33 that jointly provide each workpiece holder 35. The spacer 69 has a pair of grooves 70,71 receiving the feed rods 18,31 therein, respectively, the spacer having a width slightly greater than that of the workpieces 15, and functioning in their stead as part of the lost motion drive. With the spacer 69, the workpiece 15 carried by the workpiece holder 35 is prevented from engagement with the projection 33 so that there will be no possibility of damage which the workpiece 15 might otherwise receive while being fed by the workpiece holder 35.

FIG. 10 illustrates a modified base 72 fixed to the feed rod 31, the base 72 being directed toward the associated projection 25 on the feed rod 18. The base 72, one rotated upwardly is greater in height than the support rails 21,22 to transfer the workpiece 15 therefrom and to carry the workpiece 15 at a level higher than the rails 21,22 during advancing movement of the feed rods 18,31 and processing operation of the machining tools.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. An apparatus for feeding workpieces intermittently, comprising:
   (a) a table;
   (b) a pair of parallel first feed rods supported on said table and spaced apart from each other, each of said first feed rods having thereon a plurality of first projections spaced therealong one from another at an interval to act on the workpieces;
   (c) a second feed rod movably supported on said table and extending along and parallel to said first feed rods and having thereon a plurality of second projections spaced therealong one from another at said intervals, said first and second projections being located out of transverse alignment with each other;
   (d) first means on said table for moving said first and second feed rods axially between advanced and retracted positions, said first and second projections, acting through a workpiece or spacer, comprising a lost motion drive by which said first feed rods and said second feed rod are coupled together, and said first and second projections upon engagement of said lost motion drive further providing a plurality of workpiece holders while said first and second feed rods are moved from said retracted to said advanced position;
   (e) second means on said table for slidably supporting thereon the workpiece being fed intermittently; and
   (f) third means on said table for rotating said first and second feed rods about their axes between a first position in which said first and second projections extend into the path of the workpieces and a second position in which said first and second projections are retracted from said path.

2. An apparatus according to claim 1, further comprising the workpieces, said lost motion drive including said workpieces extending across said first and second feed rods and disposed respectively in said workpiece holders.

3. An apparatus according to claim 1, said lost motion drive including a plurality of spacers extending across said first and second feed rods and disposed respectively in said workpiece holders.

4. An apparatus according to claim 1, further comprising a cushioning device mounted on said table, said cushioning device having a spring-biased rod capable of acting on an end of said second feed rod when the second feed rod reaches its advanced position.

5. An apparatus according to claim 1, said third means comprising a pair of gearings each including a cylinder actuator mounted on said table and having a piston rod, a rack coupled to said first piston rod and having a pair of first and second toothed faces, a first gear mounted for corotation with one of said first feed rods and held in driving mesh with said first toothed face of the rack, and a second gear mounted for corotation with said second rod and held in driving mesh with said second toothed face of the rack, said one of said first feed rods and said second feed rod being axially movable relatively to said first and second gears, respectively.

6. An apparatus according to claim 1, said second means comprising a pair of rails extending along said first and second feed rods.

7. An apparatus according to claim 6, further comprising a plurality of bases mounted on either of said first and second feed rods, said bases being located respectively in said workpiece holders, and each of said bases, when pivoted upwardly having a height greater than that of each of said rails.

* * * * *